United States Patent
Sayre et al.

(10) Patent No.: US 9,520,580 B2
(45) Date of Patent: Dec. 13, 2016

(54) MULTIFUNCTIONAL CELL FOR STRUCTURAL APPLICATIONS

(71) Applicant: BATTELLE MEMORIAL INSTITUTE, Columbus, OH (US)

(72) Inventors: Jay Sayre, New Albany, OH (US); Steven Risser, Reynoldsburg, OH (US); Andrew James Manning, Randolph, NJ (US)

(73) Assignee: Battelle Memorial Institute, Columbus, OH (US)

( * ) Notice: Subject to any disclaimer, the term of this patent is extended or adjusted under 35 U.S.C. 154(b) by 102 days.

(21) Appl. No.: 14/398,004

(22) PCT Filed: May 8, 2013

(86) PCT No.: PCT/US2013/040149
§ 371 (c)(1),
(2) Date: Oct. 30, 2014

(87) PCT Pub. No.: WO2014/021970
PCT Pub. Date: Feb. 6, 2014

(65) Prior Publication Data
US 2015/0093629 A1    Apr. 2, 2015

Related U.S. Application Data

(60) Provisional application No. 61/643,947, filed on May 8, 2012.

(51) Int. Cl.
*H01M 2/02* (2006.01)
*H01M 2/08* (2006.01)
(Continued)

(52) U.S. Cl.
CPC .............. *H01M 2/027* (2013.01); *H01G 11/52* (2013.01); *H01G 11/72* (2013.01); *H01G 11/76* (2013.01);
(Continued)

(58) Field of Classification Search
CPC .... H01M 2/08; H01M 10/0525; H01M 2/027; H01M 2/1653; H01M 10/12; H01M 2/0262; H01M 2/168
See application file for complete search history.

(56) References Cited

U.S. PATENT DOCUMENTS 7,063,917 B2    6/2006    Kinn et al.
7,211,348 B2    5/2007    Wadley et al.
(Continued)

FOREIGN PATENT DOCUMENTS

EP      1 359 633        11/2003
JP      2007/066806      3/2007
WO      WO 2010/062391   6/2010

OTHER PUBLICATIONS

Gibson, R.F., "A review of recent research on mechanics of multifunctional composite materials and structures", Composite Structures, 2010, 92:2793-2810.
(Continued)

*Primary Examiner* — Stewart Fraser
(74) *Attorney, Agent, or Firm* — Frost Brown Todd LLC

(57) ABSTRACT

An electrochemical device comprises one or more anode, cathode, and separator. In some embodiments, the separator is also an electrolyte. In addition it has two or more current collectors. The anode and cathode are between the two current collectors and each is adhered to an adjacent current collector. The separator is between the anode and cathode and adhered to the anode and cathode. The current collectors are a barrier, and are bonded together to create a sealed
(Continued)

container for the anode, cathode, and separator. The electrochemical device may be integrated into a composite panel suitable for uses such as structural load bearing panels or sheets for aircraft wings or fuselage, composite armor, torpedo, missile body, consumer electronics, etc. The electrochemical device may include, but is not limited to, energy storage (batteries, supercapacitors), and energy generation (fuel cells).

20 Claims, 7 Drawing Sheets

(51) Int. Cl.
| | | |
|---|---|---|
| H01G 11/52 | (2013.01) | |
| H01G 11/72 | (2013.01) | |
| H01G 11/76 | (2013.01) | |
| H01G 11/80 | (2013.01) | |
| H01G 11/82 | (2013.01) | |
| H01M 10/04 | (2006.01) | |
| H01M 2/16 | (2006.01) | |
| H01M 10/0525 | (2010.01) | |
| H01M 10/052 | (2010.01) | |
| H01M 10/058 | (2010.01) | |
| H01M 10/12 | (2006.01) | |

(52) U.S. Cl.
CPC ............ *H01G 11/80* (2013.01); *H01G 11/82* (2013.01); *H01M 2/0262* (2013.01); *H01M 2/08* (2013.01); *H01M 2/168* (2013.01); *H01M 2/1653* (2013.01); *H01M 10/0413* (2013.01); *H01M 10/0436* (2013.01); *H01M 10/0525* (2013.01); *H01M 10/052* (2013.01); *H01M 10/058* (2013.01); *H01M 10/12* (2013.01); *H01M 2002/0205* (2013.01); *H01M 2220/20* (2013.01); *Y02E 60/13* (2013.01); *Y10T 29/49112* (2015.01)

(56) References Cited

U.S. PATENT DOCUMENTS

| 7,318,984 | B2 | 1/2008 | Satsuma et al. | |
|---|---|---|---|---|
| 7,704,594 | B2 | 4/2010 | Mulligan et al. | |
| 7,855,017 | B1 | 12/2010 | Snyder et al. | |
| 8,507,123 | B2 | 8/2013 | Kwon et al. | |
| 8,790,818 | B2 | 7/2014 | Coowar et al. | |
| 2003/0228517 | A1* | 12/2003 | Holl | H01M 2/021 429/162 |
| 2006/0147795 | A1* | 7/2006 | Li | H01M 4/13 429/209 |
| 2007/0015021 | A1 | 1/2007 | Shirm et al. | |
| 2008/0268341 | A1* | 10/2008 | Zhang | H01M 4/06 429/229 |
| 2008/0318105 | A1 | 12/2008 | Burling et al. | |
| 2009/0202903 | A1* | 8/2009 | Chiang | H01M 4/0426 429/203 |
| 2010/0190047 | A1* | 7/2010 | West | H01M 2/08 429/156 |
| 2012/0015229 | A1 | 1/2012 | Ohashi et al. | |
| 2013/0059173 | A1 | 3/2013 | Hucker et al. | |

OTHER PUBLICATIONS

Liu, P. et al., "Design and fabrication of multifunctional structural batteries", Journal of Power Sources, 2009, 189:646-650.

Newman, A., et al., "Structural Li-Ion Battery", 10$^{th}$ Electrochemical Power Sources R&D Symposium, Crowne Plaza Williamsburg, VA, Aug. 20-23, 2007.

South, J.T., et al., "Multifunctional Power-Generating and Energy-Storing Structural Composites for U.S. Army Applications", MRS Proceedings, vol. 851, 2004.

South, J. et al., "Design and Response of a Structural Multifunctional Fuel Cell", Army Research Lab Aberdeen Proving Ground MD Weapons and materials Research Directorate, Mar. 2008.

Synder, J.F., et al., "Multifunctional Structural Composite Batteries", Army Research Lab Aberdeen Proving Ground MD Weapons and Materials Research Directorate, Sep. 2007.

Thomas, J.P., et al., "The Design and Application of Multifunctional Structure—Battery Materials Systems", The Member Journal of The Minerals, Metals & Materials Society (JOM), vol. 57, Issue 3, pp. 18-24, Mar. 2005.

Wetzel, E.D., et al., "Multifunctional Structural Power and Energy Composites for U.S. Army Applications", Army Research Lab Aberdeen Proving Ground MD Weapons and Materials Research Directorate, Oct. 2006.

International Search Report and Written Opinion dated Feb. 17, 2014 for Application No. PCT/US2013/040149.

\* cited by examiner

Armor Design

- 2"x2"x0.33mm batteries, Qty. 4
- Centered on 20"x20" panel
- 2" between cells
- Cell dimensions could increase to 3"x3"; distance between cells could increase to 3" as well.
- Cells are placed before last layer of Vectran fabric.

Four (4) Li-ion batteries integrated into back plate

Integrated batteries covered with last layers of fiber

V50 data indicated the integrated batteries did not degrade ballistic performance.

Strike face - Four (4) shots directly in line with the integrated batteries

Back plate - Two (2) CP shots through the integrated batteries; no anomalous observations

MULTIFUNCTIONAL CELL FOR STRUCTURAL APPLICATIONS

CROSS REFERENCE TO RELATED APPLICATIONS

The present application hereby claims the benefit of PCT/US2013/040149, filed on May 8, 2013, which claimed benefit of the provisional patent application of the same title, Ser. No. 61/643,947, filed on May 8, 2012, the disclosure of which is incorporated by reference herein in its entirety.

BACKGROUND

Today's highly mobile world is very dependent upon portable power and portable power today is trending towards electric rather than gasoline, which means batteries or other electrochemical devices are the primary power source. The energy needed for many devices and applications leads to the batteries consuming a significant portion of the mass and volume allocated to the device, and also imposes significant constraints on the shape and size of the device. For example, a large portion of the mass of a laptop computer is contained in the battery, and the shape is fixed by the shape of the battery.

Because of the space and weight taken up by batteries, engineers often try to have batteries serve multiple purposes. For example, the lead acid batteries in forklifts serve as ballast for stability. There are however, more instances where added weight and or volume are not beneficial. In these cases, engineers would like to get electrochemical devices to provide additional functions besides power. There are many applications where "multi-functional" composites containing energy storage would find application. As batteries take up space, one of the most obvious approaches is to have them contribute to the mechanical aspects of the structure. As most batteries are delivered in cases, it is technically feasible to try to gain structural aspects from fastening them together. However, this after-the-fact approach is not optimal.

There have been efforts in the past to use the carbon fiber in composites as anode material for lithium ion batteries and turn the composite into a battery. However, due to numerous problems with the composite resin, the carbon mat thickness, the need for vapor barriers and electrolytes, the efforts were never commercially successful. A much more direct approach is to embed individual lithium ion cells into a composite or polymer.

Unmanned Arial Vehicles (UAVs), and especially Micro UAVs that have electric propulsion are excellent examples which are critically dependent on weight and where composite structural panels are common. Accordingly, there is interest in using advanced multi-functional composites. Bending modulus is critical to UAV panels and the mechanics of bending are well understood. Consumer electronics are additional examples that are dependent on mass and volume. Accordingly, it is desirable to use multi-functional cells in the structure of these devices to reduce the mass and volume associated with the power supply without reducing the capacity or safety.

BRIEF SUMMARY

An electrochemical device comprises one or more anode, cathode, and separator. In addition it has two or more current collectors. In some embodiments, the separator is also an electrolyte. The anode and cathode are between the two current collectors and each is adhered to an adjacent current collector. The separator is between the anode and cathode and adhered to the anode and cathode. The current collectors are a barrier, and are sealed together to create a sealed container for the anode, cathode, and separator. The electrochemical device may be integrated into a composite or polymer panel suitable for uses such as structural load bearing panels or sheets for aircraft wings or fuselage, composite armor, unmanned underwater vehicle, torpedo, missile body, consumer electronics, etc. The electrochemical device may include, but is not limited to, energy storage (batteries, supercapacitors), and energy generation (fuel cells).

These and other objects and advantages shall be made apparent from the accompanying drawings and the description thereof.

BRIEF DESCRIPTION OF THE FIGURES

The accompanying drawings, which are incorporated in and constitute a part of this specification, illustrate embodiments, and together with the general description given above, and the detailed description of the embodiments given below, serve to explain the principles of the present disclosure.

DETAILED DESCRIPTION

There is a need to provide improved energy storage technologies for a variety of applications, where the storage device is: thinner, lighter with higher energy, power, or both per unit mass and volume (specific energy and density), can conform to a variety of surface shapes, and can withstand mechanical loads. The device may be a battery, supercapacitor, a combination of both, or other electrochemical device.

A multilayer electrochemical device embedded within a composite or polymer panel possesses both the mechanical attributes necessary to carry shear stress, thus contributing to the bending modulus and increased energy density for any given chemistry. The electrochemical device may use various battery chemistries or super capacitor chemistries. Panels containing these devices can be made with various three dimensional structures which can provide structural support. Thin structures can withstand some degree of flexing. The devices may be used in a variety of structural panels subjected to stresses for many applications. The outside layer metal current collectors act as the packaging for the electrochemical device, and all the inner layers of the electrochemical device, including the current collectors, the anode(s) and cathode(s) and the separator(s) are adhered together so as not to provide a slip plane that would compromise the strength of the panel.

Figure 1:
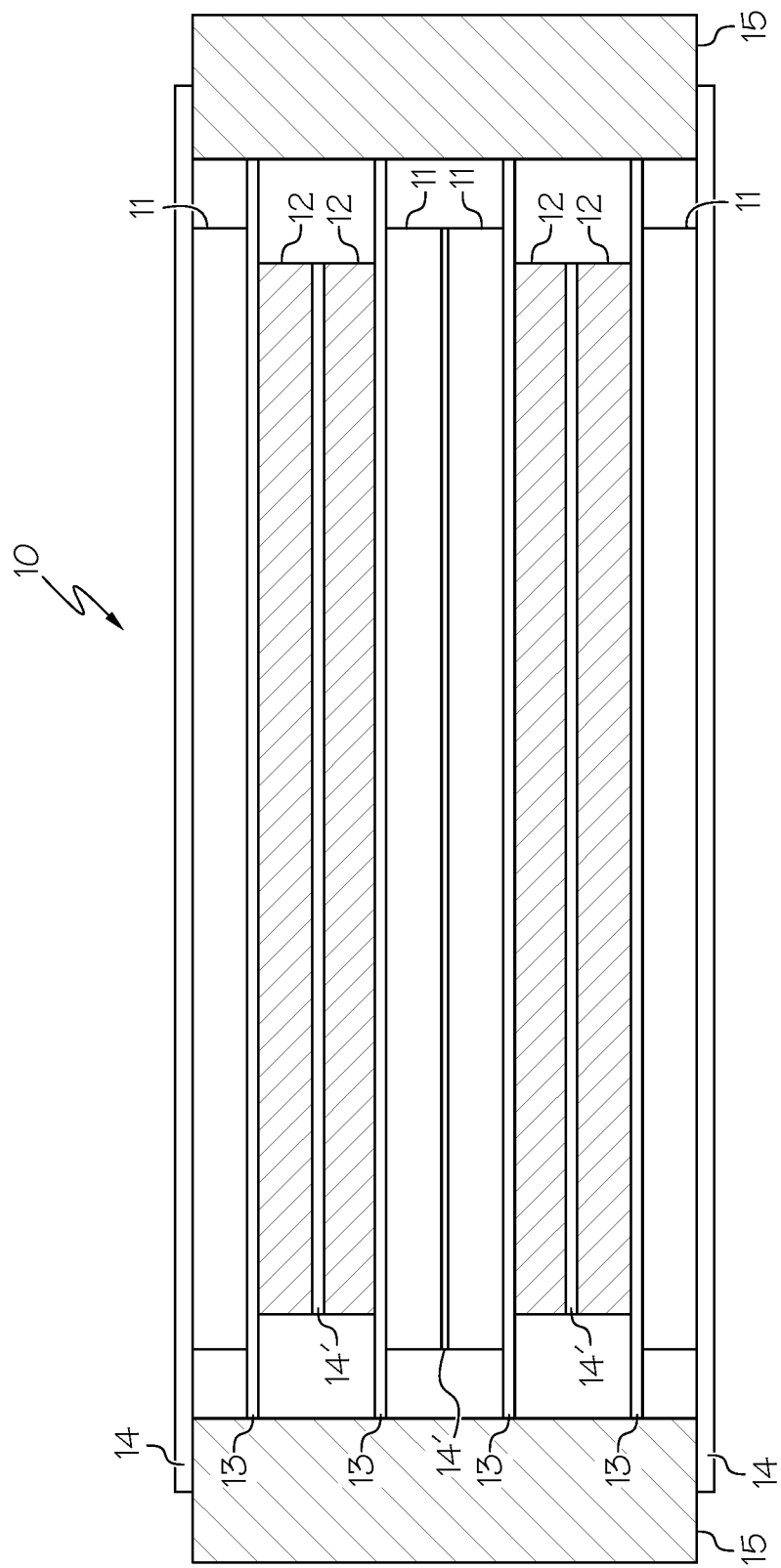
FIG. 1 is a schematic drawing of an embodiment of an electrochemical device.

An electrochemical device (10) comprises one or more anode (11), cathode (12), and separator (13). In some embodiments, the separator (13) is also an electrolyte. In addition it has two current collectors (14). The anode (11) and cathode (12) are between the two outer current collectors (14) and each is adhered to an adjacent inner current collector (14'). The separator (13) is between the anode (11) and cathode (12) and adhered to the anode (11) and cathode (11). The outer current collectors (14) are a barrier against leakage of the electrolyte and against moisture and oxygen. They are sealed together to create a sealed container for the one or more anode (11), cathode (12), and separator (13), either by a polymeric layer between them or directly by welding. In some embodiments, as shown in FIG. 1, the device (10) additionally comprises a perimeter seal (15). The perimeter seal (15) is bonded between the two outer current collectors (14), and the combination of outer current collectors (14) and perimeter seal (15) act to create the sealed container for the one or more anode (11), cathode (12), and separator (13).

In some embodiments, the electrochemical device comprises two or more anodes, cathodes, or both. The anodes or cathodes may be double-sided, which is an electrode attached to a current collector, such as in the middle of the electrode layer. A separator layer is on both sides of the double-sided electrode, and the opposite electrode is adjacent to the separator layer on both sides. In some embodiments, the device comprises at least one double-sided cathode. In some embodiments, the device comprises at least one double-sided anode.

In some embodiments, the anode may be for a lithium ion electrochemical device. Examples of anodes include, but are not limited to carbon, lithium titanate, silicon, tin, and others. The anode should be pin hole free. In some embodiments, the anode may be for a NiMH (nickel metal hydride) electrochemical device. Examples of anodes include, but are not limited to hydrogen-absorbing metal alloys. In some embodiments, the anode may be for a supercapacitor. Examples of anodes include, but are not limited to high surface area carbon, metal oxides, and nitrides. In some embodiments, the anode may be for a lead acid electrochemical device. Examples of anodes include, but are not limited to lead, lead compounds such as lead sulfate, carbon, and lead-carbon mixtures. In some embodiments, the anode may be for a Li—S(lithium sulfur) electrochemical device. Other anodes are well known in the art. In some embodiments, the thickness of the anode is from about anode 1 to about 100 microns, such as about 10 to about 80 microns, about 20 to about 70 microns, about 25 to about 60 microns, and about 20 to about 40 microns.

In some embodiments, the cathode may be for a lithium ion electrochemical device. Examples of cathodes include, but are not limited to lithium cobalt oxide, nickel cobalt aluminum oxide, manganese oxide, manganese spinel, nickel-manganese-cobalt oxide, nickel-manganese oxide, lithium iron phosphate, lithium cobalt phosphate, lithium manganese phosphate, and derivatives, and sulfur. In some embodiments, the cathode may be for a NiMH (nickel metal hydride) electrochemical device. Examples of cathodes include, but are not limited to nickel hydroxyl and oxyhydroxy compounds. In some embodiments, the cathode may be for a supercapacitor. Examples of cathodes include, but are not limited to high surface area carbon, metal oxides, and nitrides. In some embodiments, the supercapacitor cathode has the same composition as the anode, or may have a different composition. In some embodiments, the cathode may be for a lead acid electrochemical device. Examples of cathodes include, but are not limited to lead sulfate, and lead oxide. In some embodiments, the cathode may be for a Li—S(lithium sulfur) electrochemical device. Other cathodes are well known in the art. In some embodiments, the thickness of the cathode is from about 1 to about 200 microns, such as about 10 to about 150 microns, about 25 to about 120 microns, and about 50 to about 100 microns, and about 60 to about 80 microns.

The current collector may be for an anode or cathode. The outer current collectors act as a barrier, which prevents the passage of electrolyte, oxygen and water. In some embodiments, the current collector acts as a mass transport barrier. Examples of current collectors for anodes include copper, aluminum, nickel, and stainless steel. Aluminum current collectors may be useful for both the anode and cathode if the cell voltage is about 3 volts or less. In some embodiments, the outer current collectors are a solid foil and of sufficient thickness so as not to have pinholes. In some embodiments, the outer current collectors are very thin, such as about 5 to about 50 microns, about 10 to about 30 microns, about 10 to about 25 microns, or about 15 to about 20 microns. In some embodiments, the inner current collectors are very thin, such as about 5 to about 50 microns, about 10 to about 30 microns, about 10 to about 25 microns, or about 15 to about 20 microns. The current collectors are electrochemically stable to the voltages of the cell and preferably exhibit low resistance. They are of sufficient strength to be processed and preferably can bend around rolls for continuous processing. The external current collectors are pinhole free to provide the barrier properties and of at least minimal strength to prevent damage during processing and integration into a composite. The surface should provide good wetting and bonding to the resin of the composite. Examples of current collectors for cathodes include aluminum and stainless steel. In some embodiments, the current collector may be nickel.

A current collector may be embedded within an anode or cathode (double-sided anode or cathode) if it is not the outer layer of the electrochemical device. A current collector within an anode or cathode need not be a solid foil, it may selected from expanded metals, carbon nonwoven webs, and metal coated carbon non-woven webs and metal coated non-woven polymer webs. In some embodiments, all the cathodes are electrically connected together in parallel, such as by connecting all the current collectors attached to the cathodes, and all the anodes are electrically connected together in parallel, such as by connecting all the current collectors attached to the anodes. In some embodiments, the electrodes are connected serially.

In some embodiments, the outer current collectors are bonded or adhered to the adjacent electrode. In some embodiments, the outer current collectors are each independently bonded or adhered to anodes. In some embodiments, the outer current collectors are each independently bonded or adhered to cathodes. The outer current collectors are prepared by one of several methods. The electrode material may be "patch" coated onto the current collector. Patch coating involves applying coating to only a portion of the current collector, such as leaving the perimeter clean so that the perimeter may be sealed to the other outer current collector. Patch coating can be achieved by intermittent coating by a reverse roll or similar coater, a screen coater/printer, printing, gravure coating, ink jet printing, or any other application technique that permits uncoated areas. Another method is to apply a continuous coating and then clean off the areas to seal. A third way is to mask the area to be left uncoated. It may be beneficial to use a primer between the current collector and the electrode to increase adhesion and/or improve performance as is well known in the art.

In some embodiments, where the outer current collectors are of the same polarity, the outer current collectors can be welded together. They are fully welded together with the exception of a passage for the alternate terminal. This can be accomplished by ultrasonic welding, laser welding, or a pulsed DC welder with a contact wheel known as a rotary seamer. When welded together, the outer current collectors provide a very good barrier. They are sealed hermetically. However, even when sealed, the current collectors allow the opposite electrode to exit the device without making an electrical connection to the opposite electrode.

In some embodiments, the electrochemical device additionally comprises a perimeter seal. In some embodiments, the perimeter seal is also a barrier to oxygen, or moisture, and a barrier to the electrolyte. In some embodiments, the perimeter seal is used as an electrical insulator to prevent an electrical connection between the two outer current collectors. The perimeter seal is stable in the presence of the electrolytes and may help to carry stress. The current collector may be treated beforehand to enhance the sealing to the perimeter seal. Examples of perimeter seals include: ionomer resins (such as Surlyn®), ethylene acrylic acid (EAA), polyolefin, acidified polyolefin, polyvinylidene difluoride (PVDF), polyimide, polyamide, epoxy, and polyurethane, and other polymeric material that bonds well to metal foils and is inert to the electrolyte. In some embodiments, the separator is bonded to the perimeter seal. A perimeter seal is bonded to the outer current collectors, and acts as a barrier to moisture, oxygen, or both, and prevents the migration of the electrolyte. Transmission through the seal is dependent upon the seal width and cross-section. A thinner and/or wider seal minimizes migration. The films prior to sealing are in the range of about 10 to about 150 microns, such as about 25 to about 125 microns, about 30 to about 110 microns, or about 50 to about 100 microns. In some embodiments, the perimeter seal is applied as a coating. The perimeter seal is able to withstand the buildup of internal pressure (up to about 2 atmospheres) and temperatures of at least 130° C.

The separator is an electrical insulator that allows the electrolyte to conduct ions without conducting electrons. In some embodiments, the separator is also an electrolyte. In some embodiments, an adhesive layer is applied to the separator to adhere the anode and the cathode to the separator. Examples of separators include microporous polyolefin, a ceramic coated polyethylene terephthalate (PET), and PVDF. In some embodiments, the separator is coated with an adhesive layer selected from poly(vinylidene fluoride-co-hexafluoropropylene) (PVDF-HFP) copolymer, chlorinated polypropylene, and maleic anhydride/polypropylene. In some embodiments, the separator is a polymer selected from polyimides and polyamides, wherein the polymer is interdispersed with at least one adhesive resin, such as modified polypropylene, to form a separator with intrinsic adhesive characteristics. In some embodiments, the separator is a polymer selected from crosslinked PVDF and crosslinked poly(ethylene oxide) (PEO).

In some embodiments, the adhesive layers are thermally activated, the adhesive is activated, and the separator bonds the electrodes together after the electrolyte has been added and allowed to migrate into the separator and electrodes. A low melting point adhesive resin (such as about 80 to about 85° C.) can be used that does not damage the electrolyte, but bonds all the layers together with heat and pressure.

In some embodiments, the separator is from about 5 to about 250 microns in thickness, such as from about 10 to about 100 microns, and about 10 to about 50 microns. To allow the electrolyte to conduct ions, the separator has void space. In some embodiments the separator is from about 10% to about 90% void, such as from about 20% to about 80%, about 30% to about 80%, about 40% to about 70%, and from about 45% to about 65%. The voids in the separator are in the form of interconnected pores. The average size of the pores in the separator range from about 30 nm to 10 microns, such as from about 40 nm to about 7 microns, about 50 nm to about 5 microns, and from about 100 nm to about 2 microns.

Figure 2:
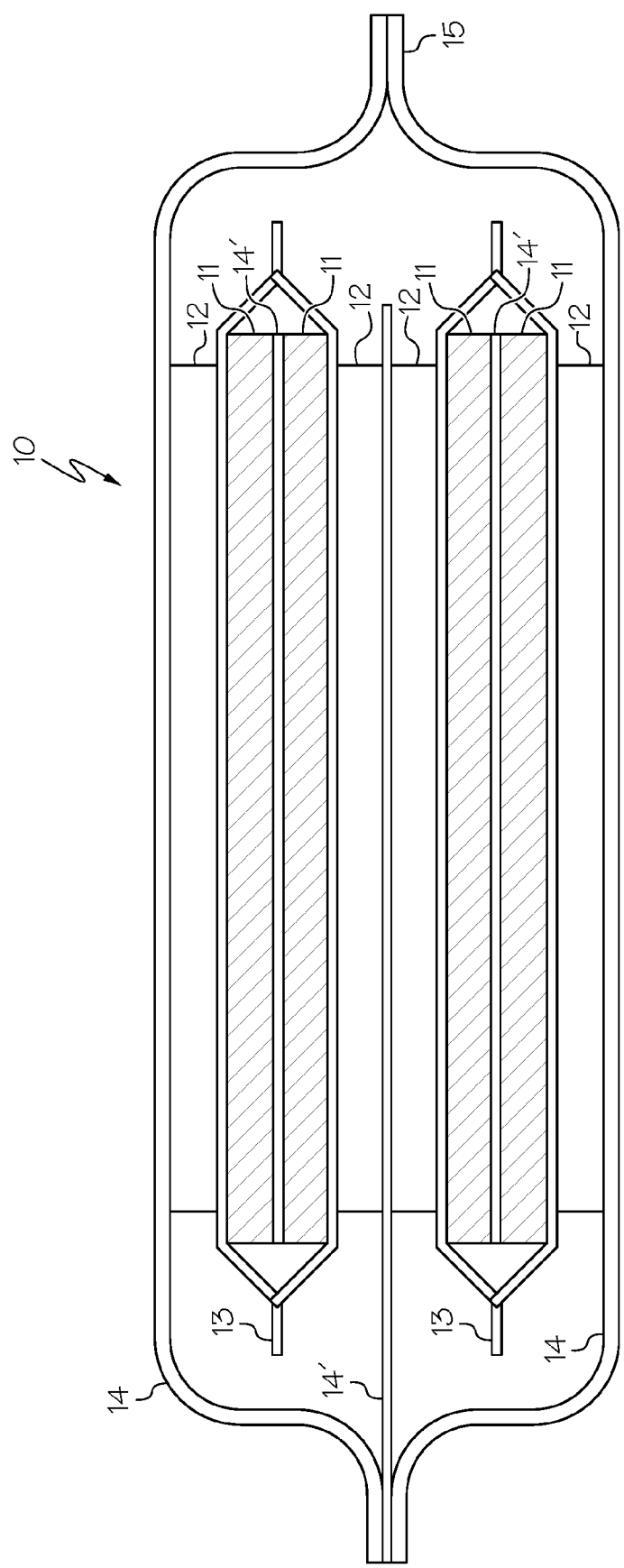
FIG. 2 is a schematic drawing of an embodiment of an electrochemical device.

In some embodiments, the separator (13) is wrapped around an electrode and sealed around it. The separator (13) is effectively formed into a bag or pouch like structure and an electrode is enclosed inside the separator (13), as shown in FIG. 2. The outer current collectors (14) are sealed together to form a perimeter seal (15). This helps to prevent shorting. In some embodiments, the electrode is double-sided. When the device is fabricated, an electrode enclosed in a separator (13) is placed on top of an electrode of the opposite polarity, and a second electrode of the opposite polarity is placed on top of the enclosed electrode.

The electrolyte used in the electrochemical device depends on the nature of the anode and cathode. The electrolyte may be a liquid or solid. For lithium-ion batteries, the electrolyte may be a mixture of carbonates or other high dielectric solvents with a lithium containing salt, such as $LiCO_3$, $LiPF_6$, $LiAs_4$, $LiBO_4$, lithium bis(oxalate)borate (LiBOB), and triflate. Examples of solvents include ethylene carbonate (EC), diethyl carbonate (DEC), dimethyl carbonate (DMC), ethylmethyl carbonate (EMC), propylene carbonate (PC), γ-butyrolactone, as well as special additives such as vinyl ethylene carbonate (VEC), fluoro ethylene carbonate (FEC), and methyl acetate (MA). The concentration of the salts is optimized to the system, but is generally in the range of 1 molar. In other embodiments, the electrolyte may be an ionic liquid. For NiMH cells, the electrolyte may be an aqueous alkaline solution, such as potassium hydroxide. For lead acid batteries, the electrolyte is an aqueous acidic solution.

In some embodiments, electrochemical device may also comprise a supercapacitor. In these devices, the electrolyte may be either an aqueous or non-aqueous solvent containing a salt or other ionic species.

A structural panel may be made comprising the electrochemical device. The panel and the electrochemical device provide a structural support. Because the electrochemical device is a solid mass and can transmit stress and does not compress or slip it does not weaken or significantly weaken the panel it is part of.

Figure 3:
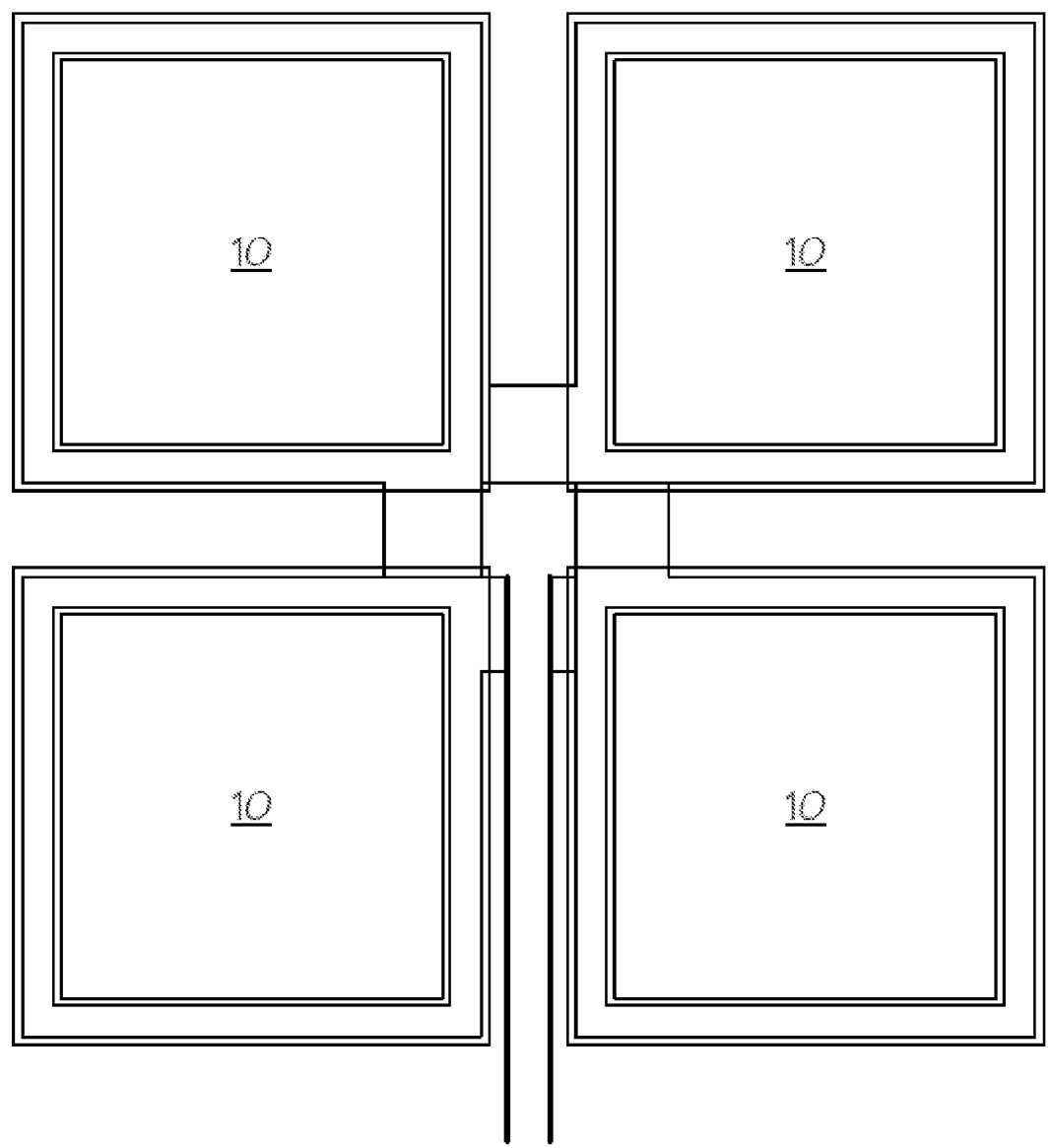
FIG. 3 is a top view of four cells connected in series ready to be embedded in composite.

In one embodiment the electrochemical device can then be assembled into panels by embedding one or more in a mosaic structure as shown in FIG. 3, within a composite. In some embodiments the composite comprises a thin glass fiber (or other suitable material)/epoxy (or other suitable material) layer on each side. The composite adhesively bonds to the outer current collector metal surfaces of the electrochemical device and provides protection to the outer current collectors. The cells can easily be arranged and wired in series connections to provide conventional voltages of 14V, 28V, or even higher voltages within a single panel. The mosaic structure offers further benefits of creating a honeycomb like continuous phase. The size of the electrochemical devices can be adjusted to optimize different objectives. Very large electrochemical devices can be used to maximize specific energy, or a mosaic of smaller cells can be used to provide redundancy in case an electrochemical device is damaged (by enemy fire or other events).

In some embodiments, the panel is planar, or has a simple (single directional) curve. It can be thin or ultrathin which provides a much higher specific energy for the form factor. This structural integrity is a necessary element of producing a curved cell that will retain its shape. Using the outside current collector layer metals as the packaging of the cell eliminates the non-contributing weight of the pouch packaging. The panel material becomes the battery package, which bonds to the metal surfaces of the foils during processing and protects the cells from physical damage. In some embodiments, the panel material is a composite selected from carbon fiber and fiberglass. In some embodiments, the majority of the outer surface of the electrochemical device is encased in the polymer. In some embodiments, the electrochemical device and panel are curved.

Fabrication

The individual electrochemical devices may be laid up as a two-dimensional tiled array within the composite. The gaps between the single electrochemical devices of a multi-cell battery will also allow for adhesive bonding between successive layers of composite materials, or will allow the polymeric panel material to fill the gaps. The design can employ large numbers of individual electrochemical devices in parallel and in series to provide higher total capacity as well as higher voltages. Further the multi-electrochemical device two-dimensional array design provides a high level of redundancy where if one electrochemical device is damaged, the remainder of the electrochemical devices will still function.

The layers in the electrochemical device are fully bonded rather than a stack of loose individual layers. Outer packaging is not needed for the electrochemical device; instead the current collectors serve as part or all of the packaging, as shown in the cell design of FIG. 4 and the image of FIG. 5.

The electrochemical device, as it is a laminated structure, can be easily fabricated in a simple curved structure as well a flat panel. The device must have the appropriate dimensions for the curvature and must be fabricated in or near the final shape. Complex contours are possible by pre-forming the foils.

Figure 4:
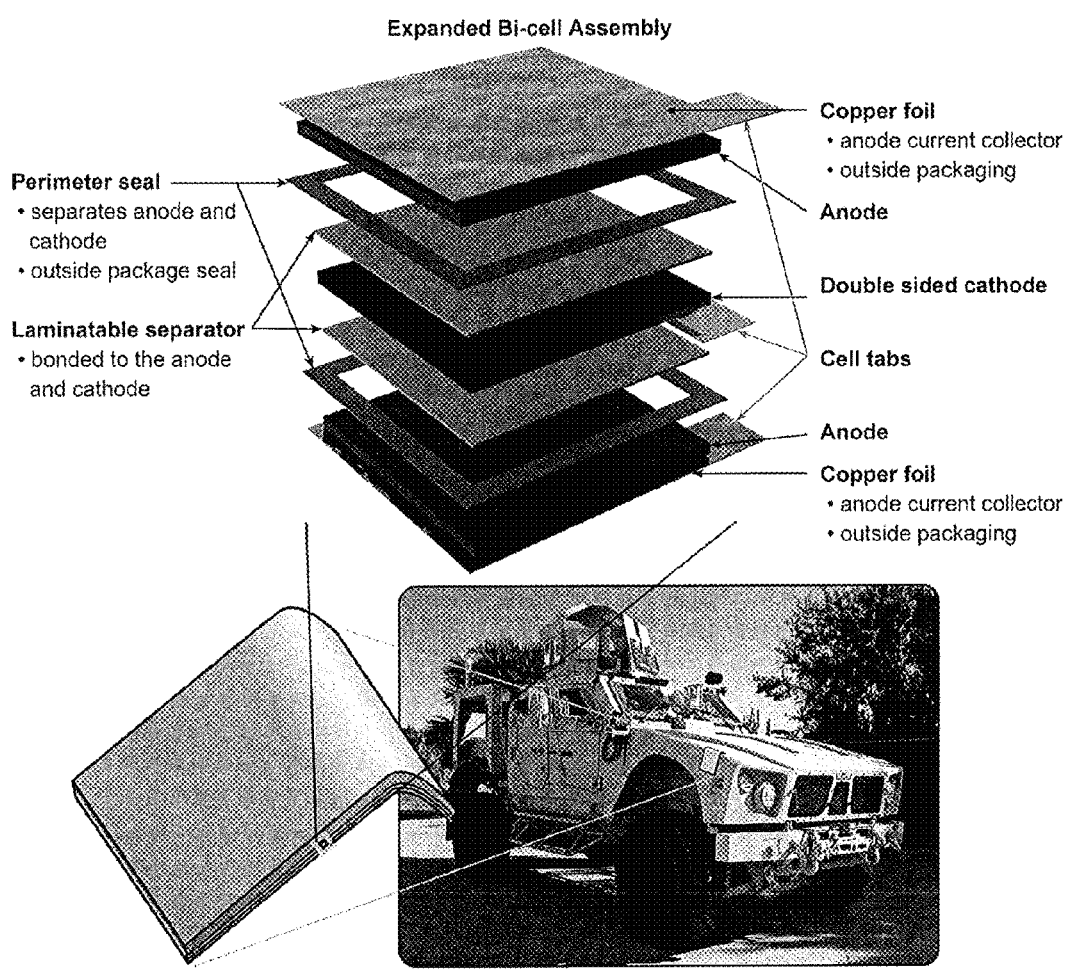
FIG. 4 is a drawing an embodiment of a battery showing an expanded Bi-cell assembly.
Figure 5:
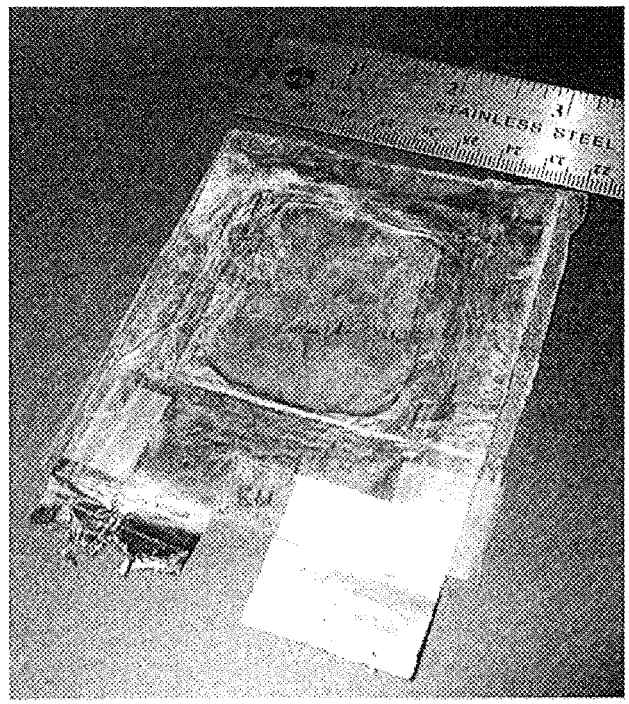
FIG. 5 is a photograph of an embodiment of a battery showing the Cu foil current collector/outside packaging.

In one embodiment, the outer current collector forms one terminal, which may be either copper or aluminum foil, may have a tab for the opposite electrode coming though the sealed outer current collectors, or the perimeter seal on one side. The device can be structured with copper foil on one side and aluminum (positive terminal) on the other. The cells can then be assembled into panels by embedding them in a composite or polymer with a thin composite or resin layer on each side as shown in FIGS. 3 and 4.

The electrochemical device may be incorporated into a variety of fabrication methods, such as hand layup, resin transfer molding, vacuum assisted resin transfer molding, resin film infusion, filament winding, pultrusion, etc., thereby creating complex 3D multifunctional structures (including sandwich constructions, which combine a lightweight core material with laminated composite skins). Adhesion of the electrochemical device within the panel prevents it from behaving as a defect or a void by allowing the matrix to bond to the metal foils. In some embodiments, the outer current collectors are treated before cell assembly to enhance the adhesion between the resin and the current collector. Methods to enhance adhesion include mechanically or chemically roughening the outer surface of the current collectors to increase surface area, or applying a tie coating such as a silane to the outer surface of the current collector.

Properties

This composite integrates structural and energy functionality into a single component to eliminate the redundancies of parasitic mass that previously existed in the sum of the individual components. The result is a multifunctional composite panel that produces a 39% or greater increase in specific energy compared to standard batteries containing the same chemistry, and offers an opportunity to increase payload, operational lifetime, safety, or function compared to state-of-the art battery technologies.

In some embodiments the electrochemical device is a Li-ion bi-cell that comprises a bonded microporous polymeric separator, copper foil current collectors (about 10 microns thick), aluminum foil current collectors (about 15 microns thick), and liquid EC/EMC electrolyte. In some embodiments, the electrochemical device has two outside anodes and a double-sided cathode. Such an electrochemical device may be 0.33 mm thick, have a nominal open circuit voltage of 3.7 V per cell, and a 5.6 mAh/cm$^2$ cathode capacity (2.8 mAh/cm$^2$ per side). Assuming a 100 cm$^2$ cell active area, this equates to a 560 mAh cell capacity producing 2.072 Wh at a mass of 11 g. Therefore, the specific energy is 188.72 Wh/kg, and the areal energy density is 207.2 Wh/m$^2$. Assuming the hull of a vehicle has a usable surface area of 10 m$^2$, the result would be total energy storage of 2,072 Wh for a vehicle.

The gain in specific energy for this size device is significant. For example, a conventional cell and packaging of this scale weights approximately 4 g more, which means the specific energy would drop to approximately 136 Wh/kg. The electrochemical device has an approximately 39% improvement in specific energy over a state-of-the-art Li-ion cell, assuming one could be procured at 0.33 mm thickness.

The electrochemical devices may be fabricated into a composite at either 95° C. or 130° C. An upper limit of 130° C. allows this technology to be embedded into ultra high molecular weight polyethylene (UHMWPE), such as Dyneema® and Spectra Shield®, or fiberglass composites, such as HJ1, during consolidation. The Freya Energy safety separator (developed by Freya Energy Inc, Melbourne Fla., www.freyaenergy.com to provide improved safety in lithium ion cells), was modified by Freya Energy by increasing the percentage bonding resin and changing the thermal protection resin to increase the adhesive bond strength and increase the temperature tolerance for the composite fabrication. Processing pressures are not an issue for the cells as they are designed to withstand 10,000 psi hydrostatic pressure; therefore, they should withstand typical composite processing pressures.

In some embodiments, an electrochemical device has multiple electrodes, which together to give a thicker, higher capacity, and higher specific energy device. This is especially useful where the bending modulus is more important than strength (such as in an airfoil) as the thicker device adds thickness to the composite panel. A thicker device also facilitates the use of non-woven current collectors in the inner electrodes further increasing specific energy and energy density.

Supercapacitor

In some embodiments, the electrochemical device is a supercapacitor, or a battery hybridized with a supercapacitor. For a supercapacitor device that has an anode and cathode material with overall density of about 2 g/cm$^3$, the electrolyte has a density of about 1 g/cm$^3$, and the anode and cathode material will have a capacitance of about 200F/g, the capacitance of the system is about 0.2F (because the electrodes are in series). Assuming electrode thickness of 10 microns and a voltage of 1.5V across the electrodes (asymmetric configuration), the areal energy density is:

$$\frac{E}{cm^2} = \frac{1}{2}CV^2 = \frac{0.225J}{cm^2} = 0.625 \text{ Wh/m}^2$$

If a vehicle has usable surface area of 10 m$^2$, then there can be a total energy storage of 6.25 Wh due to the supercapacitor alone, for a single layer device with a thickness 70 microns. If multiple layers are formed, the areal energy density will increase. With 20 layers (approaching 1 mm thick), the energy density would be 12.5 Wh/m$^2$.

Considering the power of the system, if the total energy stored for a single layer of 6.25 Wh, a 5-second discharge of this energy would provide average power of 4,500 W. With a discharge time of 1 second, this would equate to 22,500 W from the single layer. Multiple layers would act to increase this more than linearly.

Table 1 shows a breakdown of the attributes of an electrochemical battery and supercapacitor.

TABLE 1

Critical Attributes of the Example Structural Battery and Supercapacitor

| Battery | Nominal cell open circuit voltage (V) | 3.7 |
|---|---|---|
| | Cell active area (cm$^2$) | 100 |
| | Cell thickness (mm) | 0.33 |
| | Cell capacity (mAh) | 560 |
| | Specific energy (Wh/kg) | 188.72 |
| | Areal energy density (Wh/m$^2$) | 207.2 |
| Supercap | Operating voltage (V) | 1.5 |
| | Layer thickness (μm) | 40 |
| | Areal energy density per layer (Wh/m$^2$) | 0.625 |
| | Areal power density per layer for a 1 second discharge (W/m$^2$) | 2,250 |

Composites Overview

Beyond high strength and low weight, composite materials can offer a multitude of other properties such as good vibrational damping and low coefficient of thermal expansion. These characteristics may be modified to allow them to be engineered for specialized applications.

The electrochemical device may exploit the structural properties of the composite material that are derived primarily from continuous, oriented high-strength fiber reinforcement in a binding matrix to provide packaging while promoting processability and enhancing properties such as stiffness, and chemical and hygroscopic resistance. Laminates may be designed to be isotropic or anisotropic, balanced or unbalanced, symmetric or asymmetric, depending on the in-use forces a component must withstand. The electrochemical device may be incorporated into laminates making it possible to develop lightweight, complex shapes and to produce large parts with integral reinforcing members while providing additional functionality afforded by this invention.

Ingredients for composite materials that may be used with the electrochemical device include, but are not limited to: additives and modifiers, such as, ablatives, colorants, pigments, conductive fillers, coupling agents, decorative flakes, flame/smoke-suppressant additives, foaming agents, low-profile additives, styrene-suppressant additives, thickening agents, toughening agents, UV stabilizers, and viscosity control agents. Adhesives include, but are not limited to: acrylic, bismaleimide, cyanoacrylate, epoxy, nylon, phenolic, polyimide, silicone, and urethane. Casting resins include, but are not limited to: acrylic, epoxy, and unsaturated polyester. Catalysts, promoters, and curing agents include, but are not limited to: cobalt naphthenate, amines, hardeners, initiators, and peroxides. Coatings and sizings include, but are not limited to: conductive, decorative, electrostatic, EMI-attenuation, flame retardant, in-mold, paint, powder, and protective. Compounds that may be used include, but are not limited to: bulk molding (BMC), fairing compounds (formerly paste systems), low-pressure molding, sheet molding (SMC), solid surface, thermoplastic, and thick molding. Core materials and flow media include, but are not limited to: balsa, flow media for resin infusion, foam core, honeycomb, inorganic, expanding syntactic core, and nonexpanding syntactic core. Fabrics that may be used include, but are not limited to: aramid, aramid/glass hybrid, C-glass, carbon, carbon/aramid hybrid, carbon/glass hybrid, ceramic, E-Glass, metallized, and structural high-strength glass (S- and R-type). Inorganic fibers that may be used include, but are not limited to: aluminum, basalt, boron, C-Glass, ceramic, E-Glass, quartz, silicon carbide, and structural high-strength glass (S- and R-type). Organic fibers that may be used include, but are not limited to: aramid, PAN-based carbon, pitch-based carbon, rayon-based carbon, hybrid commingled fibers, nylon, polybenzimidazole, polyester, polyethylene, and UHMW polyethylene (ultra-high molecular weight). Fillers that may be used include, but are not limited to: alumina trihydrate, calcium carbonate, calcium sulfate, carbon black, gypsum, kaolin, mica, microspheres, milled glass fiber, nanophase (organic/inorganic), recyclate, silica, amorphous silica, talc, and wollastonite. Gel coats that may be used include, but are not limited to: anti-fouling, chemical-/corrosion-resistant, conductive, fire-retardant, general-purpose, marine, potable-water grades, and UV-curable. Matrix materials that may be used include, but are not limited to: ceramic and metallic. Thermoplastic matrix resins that may be used include, but are not limited to: acetal, acrylonitrile butadiene styrene (ABS), liquid crystal polymer, methyl methacrylate, nylon (polyamide), PBT, polyamide-imide, polyarylene ketone, sulfide, polycarbonate, polyester (PET), polyether ketone family (PEK, PEKK, PEEK), polyetherimide, polyethersulfone, polyethylene, polyimide, polyphenylene sulfide (PPS), polypropylene, polyvinyl chloride, fluorinated polymers, polystyrene, styrene monomer (diluent), acrylonitrile, polybutylene terephthalate, polyphenylene oxide, polysulfone, polydimethylsiloxane, polyurethane, polyvinyl alcohol, PVDF, and polytetrafluoroethylene. Thermoset matrix resins that may be used include, but are not limited to: acrylic, bismaleimide, cyanate ester, epoxy, phenolic, polyimide, unsaturated polyester, urethane, UV-curable, and vinyl ester. Unimpregnated preforms that may be used include, but are not limited to: aramid, carbon, ceramic, chopped fiber, continuous fiber, E-Glass, hybrid fiber, quartz, and structural high-strength glass (S- and R-type). Thermoplastic prepregs that may be used include, but are not limited to: commingled/cowoven yarns, fabric, interlaced, mat, RTP sheet (GMT), tape, and tow or roving. Thermoset prepregs that may be used include, but are not limited to: bismaleimide, cyanate ester, epoxy, phenolic, unsaturated polyester, polyimide, and vinyl ester. Unimpregnated reinforcements that may be used include, but are not limited to: aramid, aramid/glass hybrid, C-glass, carbon, carbon/aramid hybrid, carbon/glass hybrid, ceramic, E-Glass, and structural high-strength glass (S- and R-type). In some embodiments, the electrochemical device is incorporated into neat thermoset or thermoplastic polymers without additional reinforcement using traditional thermoset or thermoplastic processing techniques, such as blow molding, injection molding, extrusion, thermoforming, vacuum forming, compression molding, etc.

Product Applications

Figure 6:
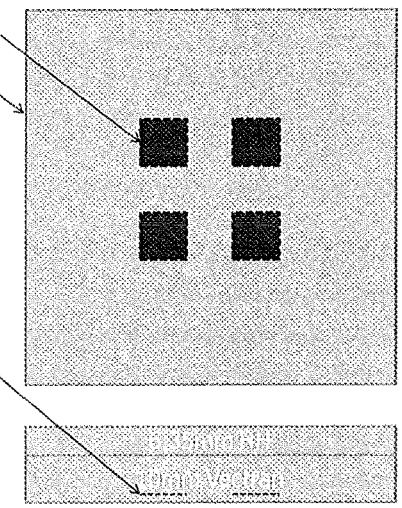
FIG. 6 is a top and side view of an embodiment of a multifunctional composite armor design.

The electrochemical device and panel composite integrates ballistic protection and energy functionality into a single component to reduce the mass that previously existed in the sum of the individual components. The result is a multifunctional armor panel, as shown in FIG. 6, that produces higher specific energy and offers an opportunity to increase payload compared to conventional battery technologies.

Further, the cell may be embedded within existing personal protective equipment suits. For example, a Nomex-based composite suit (coupled with an adhesive) will provide a suitable package for the battery; thus, providing battery and structural functionality.

Additionally, the electrochemical device and panel composite may replace inert structural components and/or aerodynamic/hydrodynamic surfaces on Unmanned Air Vehicles (UAV), Unmanned Underwater Vehicles (UUV), and missile bodies while providing electrical power to the vehicle. Increasing the energy density can expand their range/payload capability.

The electrochemical device and panel composite may be useful for other applications such as: aerospace applications, such as for fuselage, wings, wingbox, tail, empennage, ailerons, spoilers, composite inboard and outboard landing flaps, landing gear, rear spars, and fixed trailing edge assemblies, and interiors, such as seating, doors, floors, walls, aesthetic components, horizontal stabilizer, elevator and rudder, winglets, wing fixed trailing edge, wing-to-fuselage fairing, engine cowlings, engine pylons, pressure bulkhead, launch vehicles, fuel tanks, exploration instruments, satellites, space bases, and UAV airframes. Automotive applications include, but are not limited to: body panels, structural components, under-the-hood parts, frames/chassis, and drive shafts. Boating applications include, but are not limited to: yacht rigging systems (masts, shrouds, stays, and spreaders), hull, deck, and interior structure. Civil infrastructure applications include, but are not limited to: bridges and bridge beams, decking, and enclosures. Building construction applications include, but are not limited to: countertops, doors, window frames, bathtubs, and other home construction/remodeling materials, structural frame, cladding, roofing, siding, decking, emergency housing, truck trailers, outdoor signage, earthquake repair and upgrades/column wrap, manhole covers, trench covers, acoustic wall panels, marine piling, piers, residential wall panels, tanks, grating, platforms, and walkways. Appliances and business equipment applications include, but are not limited to: handles, housing, and components. Fuel cells applications include, but are not limited to: system components, such as bipolar plates, end plates, fuel tanks, and other system components. Oil and gas applications include, but are not limited to: composite risers, deep-sea umbilical, and piping. Sports and recreation applications include, but are not limited to: skis, fishing rods, tennis rackets, kayaks and paddles, windsurfing masts and boards, hockey sticks, bicycle components, and golf clubs and shafts. Renewable energy applications include, but are not limited to: wind turbine blades, wave and tidal generator rotor blades. Utility infrastructure applications include, but are not limited to: transmission towers, distribution poles and cross arms, battery boxes, casings, and telescoping portable antennas.

While the present disclosure has illustrated by description several embodiments and while the illustrative embodiments have been described in considerable detail, it is not the intention of the applicant to restrict or in any way limit the scope of the appended claims to such detail. Additional advantages and modifications may readily appear to those skilled in the art.

EXAMPLES

Example 1

Fabrication of a Structural Battery

A structural battery design consists of a Li-ion bi-cell that incorporates:
  Two-bonded microporous polymeric separators
  Two outer single sided anodes with 10 micron copper foil current collector
  One double sided cathode with 15 micron aluminum foil current collector
  Liquid LiPF6/mixed carbonate electrolyte absorbed into the electrodes and separator.

The outside anodes were cut from commercial stock, and the perimeter was cleaned using NMP to form the area for the perimeter seal. Next, two picture frame seals (with one extended side) were cut from 3 mil Suryln® film. The picture frames were then heat sealed to the anodes. Two pieces of Freya Energy safety separator modified by the manufacturer to improve adhesion and provide higher temperature tolerance were cut about 10 mm larger than the cathode. A double sided commercial cathode was cut to shape with a terminal so it extends beyond the perimeter of the anode. The cathode terminal was then coated with a high temperature polymer solution (PEI) and dried followed by an adhesion promoting layer of ethylene acrylic acid (EAA) and dried. The separator layers were then laminated to each side of the cathode. The separator became bonded to cathode and to, each other beyond the perimeter of the electrode. The excess separator was trimmed off leaving 1 to 3 mm around the perimeter of the cathode to insure complete encapsulation to prevent shorting. The cell was then assembled by stacking the 3 layers together in careful alignment and heat sealing the three sides of the picture frame, leaving the fourth side with the extended Surlyn film open. The cell was then activated by adding electrolyte through the open side. The cell was subjected to formation to charge the cell. After formation, the cell was degassed and the entire cell bonded together by heating the cell to about 90° C. and putting the cell under moderate pressure (15 to 100 psi). The cell was ready to incorporate into a composite.

The battery has a high specific energy and it is fully bonded rather than a stack of loose individual layers. The reason for this is that the cell is designed to be laminatable (with a suitable perimeter seal and laminatable separator). Outer packaging is not used; instead the foil current collectors serve as part or all of the outside packaging as shown in the cell design of FIG. 4 and the image of FIG. 5. The cell is very thin with thin foil current collectors (10-25 micron) that act as air and moisture barriers. The bi-cell with two outside anodes and a double-sided cathode in between, which, doubles the capacity and increases the specific energy slightly. The battery functionality and improved adhesion in the panels thereby creating a structural battery component that can be integrated into composite panels. This battery can be integrated into a fiber-reinforced composite where the layers of the composite will provide both structure and battery packaging (including electrical isolation). Examples of reinforcements include carbon fiber and fiberglass.

The battery is 0.33 mm thick, has a nominal open circuit voltage of 3.7 V per cell, and has a 5.6 mAh/cm$^2$ cathode capacity. Assuming a 100 cm$^2$ cell active area, this equates to a 560 mAh cell capacity producing 2.072 Wh at a mass of 11 g. Therefore, the specific energy is 188.72 Wh/kg, and the areal energy density is 207.2 Wh/m$^2$. The gain in specific energy with this approach is significant. For example, a conventional battery of this scale weights approximately 4 g more, which means the specific energy would drop to approximately 136 Wh/kg. The electrochemical device has an approximately 39% improvement in specific energy over a state-of-the-art Li-ion cell, assuming one could be procured at 0.33 mm thickness.

Figure 7:
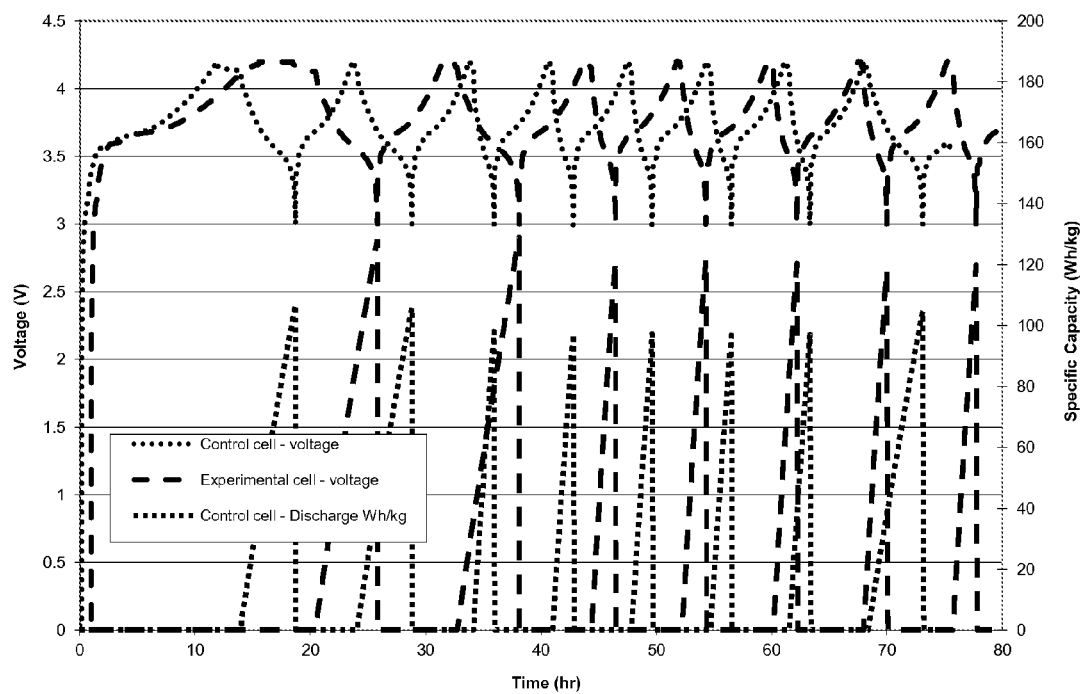
FIG. 7 is a graph of charge/discharge curves and specific capacities of an embodiment of an electrochemical device and a control battery.

Multiple single-cell battery components were fabricated and subjected to electrochemical characterization and testing to evaluate electrochemical functionality (e.g. charge/discharge curves). The batteries produced higher specific energy and energy density compared to state-of-the-art battery technologies, as shown by the data in FIG. 7. This figure compares a control cell (built using a commercial separator and standard flexible pouch packaging) to the new batteries. As seen in the graph in FIG. 7, the new cell cycle comparably to the control cell, as seen by the cell voltage. The specific capacities of the new cells demonstrate an increase in specific energy of approximately 20%. This increase in specific energy means 20% more power without any additional weight.

Example 2

Fabrication of Structural Cell with Perimeter Welded Outer Current Collectors

Figure 8:
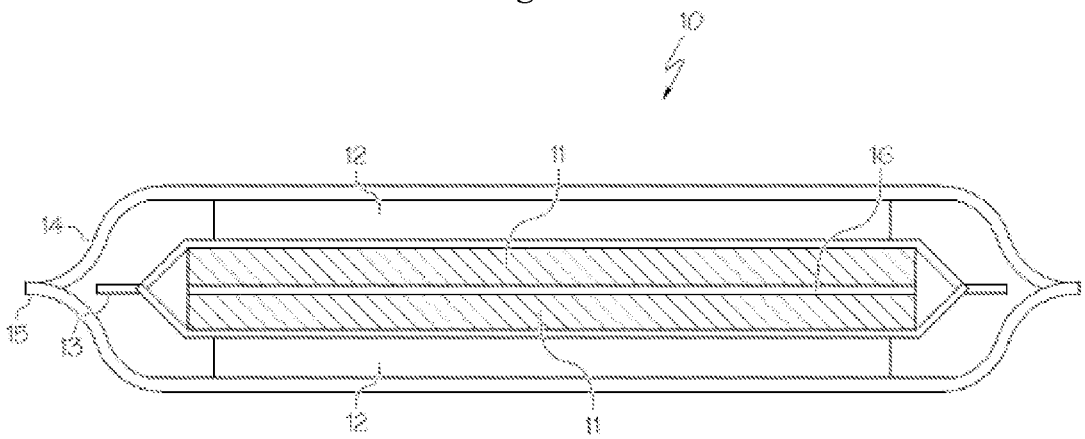
FIG. 8 is a schematic drawing of an embodiment of an electrochemical device.

A structural battery design, as shown in FIG. 8, consists of a Li-ion bi-cell electrochemical device (10) that incorporates:
Two bondable microporous polymeric separators (13)
Two outer single sided cathode (12) with 25 micron aluminum foil current collector (14)
One double sided anode (11) with 10 micron copper foil current collector (16)
Liquid LiPF$_6$/mixed carbonate electrolyte absorbed into the electrodes and separator.
A welded seam perimeter seal (15)
Two-bondable microporous polymeric separators
Two outer single sided cathode with 25 micron aluminum foil current collector
One double sided anode with 10 micron copper foil current collector
Liquid LiPF6/mixed carbonate electrolyte absorbed into the electrodes and separator.

The outside current collector was cut to size. The current collector may be two pieces or one piece folded. The cathode slurry was then patch coated by applying masking tape to the perimeter of the current collector and drawing down the slurry over the masked foil. The cathodes were then dried. Two pieces of special Freya Energy safety separator with improved adhesion and higher temperature tolerance were cut to size (about 10 mm larger than the anode). A double sided anode or hand coated double sided anode was cut to shape. A small soft copper tube was used for the terminal which extends beyond the perimeter of the cathode. The anode terminal was then coated with a high temperature polymer solution (PEI or PAI) and dried. Tin adhesion promoting layer of acidified polypropylene was heat sealed to the tab. The separator layers were then placed on each side of the anode and heat sealed around the perimeter. The excess separator was trimmed off beyond the heat seal leaving the seal around the perimeter of the anode insuring complete encapsulation to prevent shorting. The cell was then assembled by stacking the 3 layers together in careful alignment. Two sides were ultrasonically welded. The third side with the anode tab was then ultrasonically welded with a formed horn that bridges the anode terminal which was bonded to the aluminum outer current collector by heat. The fourth side was left open for activation. The electrolyte was added through the open side and then the side was ultrasonically welded. The cell was subjected to formation to charge the cell. After formation, the cell was degassed through the anode terminal, which was then ultrasonically sealed and the entire cell was bonded together by heating the cell to about 90° C. and putting the cell under moderate pressure (15 to 100 psi). The cell was now ready to incorporate into a composite.

Example 3

Fabrication of a Curved Battery

A curved structural battery design consists of a Li-ion bi-cell that incorporates:
Two-bondable microporous polymeric separators
Two outer single sided cathodes with 25 micron aluminum foil current collectors
One double sided anode with a copper coated non-woven current collector
Liquid LiPF6/mixed carbonate electrolyte absorbed into the electrodes and separator.

The outside current collector was cut to size. The current collector may be two pieces or one piece folded. If the current collected is folded, the folded edge cannot be along the curve edge. The cathode slurry was then patch coated using a patterned screen (like silk screening) and drawing down the slurry over the screen. The cathodes were then dried and calendared. Two pieces of special Freya Energy safety separator with improved adhesion and higher temperature tolerance were cut to size (about 10 mm larger than the anode). A double sided anode was made by cutting a copper coated non-woven current collector to size and attaching a small soft copper tube for the terminal using a conductive adhesive. The non-woven current collector was then dip coated in the anode slurry coating to saturate the non-woven and give the desired weight. The anode was then dried and calendered. The anode terminal was coated with a high temperature polymer solution (PEI or PAI) and dried, followed by heat sealing an adhesion promoting layer of acidified polypropylene to the tab. The separator layers were then placed on each side of the anode and heat sealed around the perimeter. The excess separator was trimmed off beyond the heat seal leaving the seal around the perimeter of the anode insuring complete encapsulation to prevent shorting.

The cell was then assembled by stacking the 3 layers together in careful alignment. If the cell does not comprise a folded cathode, one of the straight sides is ultrasonically welded. The assembly was then formed over a round or contoured anvil and the two curved sides are welded—either stepwise with a static unit continuously using an ultrasonic seamen (The side with the anode tab is treated as described in Example 1. The fourth side was left open for activation. The electrolyte was added through the open side and then the side is ultrasonically welded. The cell was subjected to formation to charge the cell. After formation, the cell was degassed through the anode terminal, which was then ultrasonically sealed and the entire cell was bonded together using a contoured press heated to about 90° C. and putting the cell under moderate pressure (15 to 100 psi) for sufficient time for the entire cell to come to a uniform temperature. The cell now had a permanent curvature to it and was ready to incorporate into a curved composite (such as the housing of a missile or torpedo).

Example 4

Composite Armor Panel Fabrication

A cast urethane process with a mold of dimensions roughly 16.5 mm×50 cm×50 cm was used to fabricate a multifunctional composite armor panel. A steel armor plate (6.35 mm×50 cm×50 cm MIL-A-46100, High Hard (HH)) was placed in the mold. A urethane mixture (prepolymer, polyols, and catalyst components) was metered as a liquid from a casting machine on top of the armor plate. A single layer of Vectran® (liquid crystal polyester-polyarylate) fabric was placed on top of the first casting of urethane. Alternating layers of urethane and Vectran® fabric were laid up in the mold until 32 layers of a Vectran®/urethane composite backing system was built up to achieve roughly 10 mm of a spall liner composite adhesively bonded to the HH steel armor plate. Prior to the last layer of fabric, on the backside of each armor panel, 4 electrochemical devices from example 1 were placed in the composite and molded into place.

Slits were cut into the last layer of fabric to allow for the tabs of the batteries to come through for interconnection. These tabs were wrapped in paper and taped down on the fabric so that no urethane could bond to them during processing and their integrity would not be compromised. The lid was placed on the assembly and clamped down to evacuate all of the excess urethane material. The clamping force was sufficient to force the extra urethane in and between all layers of the composite armor panel, and up and out of the mold. The mold temperature was maintained at about 93° C. during and after the process to ensure proper pre-cure of the material prior to demolding the part. The armor panel was demolded after approximately 20-30 minutes and subsequently post-cured at temperatures between about 93° C. to 121° C. for approximately 12 to 36 hours to ensure completion of the chemical reaction and attainment of material properties.

Figure 9:
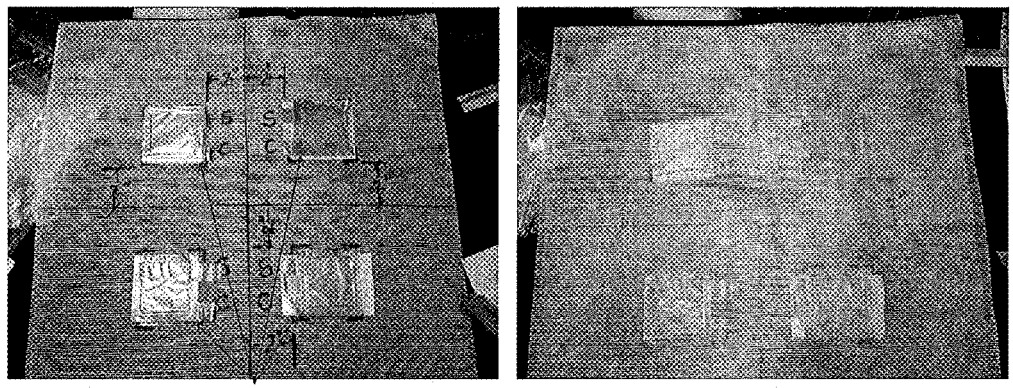
FIG. 9 is photographs of an embodiment of an electrochemical device integrated into an armor panel.

An example of this integrated product is shown in FIG. 9.

Example 5

Composite Armor Panel Ballistics Testing

Ballistic testing was conducted in accordance with the provisions of MIL-STD-662F, dated 18 Dec. 1997, using caliber .30-06 Springfield, 166 grain, AP, M2 ammunition. The test samples were mounted on an indoor range, 25.0 feet from the muzzle of a test barrel to produce zero degree obliquity impacts. Velocity screens were positioned at 10.0 and 20.0 feet, that in conjunction with elapsed time counters (chronographs), were used to compute projectile velocities 15.0 feet from the muzzle. Penetrations were determined by visual examination of a 0.020 inch thick aluminum alloy 2024T3 witness panel positioned 6.0 inches behind, and parallel to, the test samples.

The results showed a V50 Ballistic Limit (BL) of 2020 fps (2017 fps high partial, 1981 fps low partial) for the base armor panel without the batteries and a V50 BL of 2143 fps (2238 fps high partial, 2035 fps low partial) for the panels with the batteries, indicating the integration of the batteries did not degrade ballistic performance.

Figure 10:
FIG. 10 is photographs of an embodiment of an electrochemical device integrated into an armor panel after ballistic tests.
Figure 10:
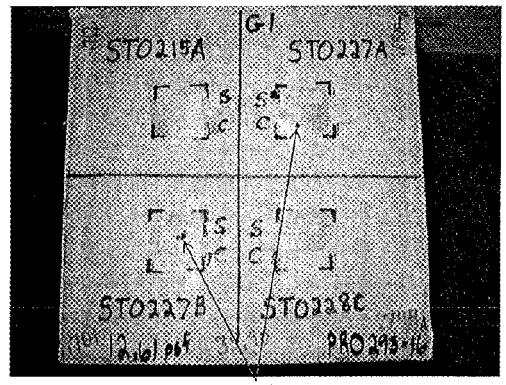

The post-test images are shown in FIG. 10, where it can be seen that even though the shots penetrated the batteries, there were no signs of fire or other safety issues during testing.

What is claimed is:

1. An electrochemical device comprising one or more anodes, one or more cathodes, one or more separators; one or more inner current collectors; and two outer current collectors;
    wherein the one or more anodes and one or more cathodes are between the two outer current collectors and each of the one or more anodes and one or more cathodes is adhered to an adjacent inner or outer collector, and the one or more separators are between the one or more anodes and one or more cathodes and are adhered to at least one anode or cathode;
    wherein the one or more inner current collectors are inside the two outer current collectors; wherein at least one of the one or more inner current collectors is not bonded to the two outer current collectors;
    wherein the two outer current collectors are a barrier; and
    wherein the two outer current collectors are bonded together to create a sealed container for the one or more anodes, one or more cathodes, and one or more separators.

2. The electrochemical device of claim 1, wherein the device is hermetically sealed inside the two outer current collectors.

3. The electrochemical device of claim 1, additionally comprising a perimeter seal, wherein the perimeter seal is bonded between the two outer current collectors.

4. The electrochemical device of claim 3, wherein the perimeter seal is selected from ionomer resin, ethylene acrylic acid (EAA), polyolefin, acidified polyolefin, polyvinylidene difluoride (PVDF), polyimide, polyamide, epoxy, and polyurethane.

5. The electrochemical device of claim 1, wherein the device comprises two or more anodes, cathodes, or both.

6. The electrochemical device of claim 1, wherein the one or more anodes, or one or more cathodes are adjacent to the outer current collectors.

7. The electrochemical device of claim 1, wherein at least one anode or cathode is a double-sided electrode.

8. The electrochemical device of claim 7, wherein the double-sided electrode is wrapped in a separator which is sealed around the electrode.

9. The electrochemical device of claim 1, wherein all the cathodes are electrically connected and all the anodes are electrically connected.

10. The electrochemical device of claim 1, wherein the separator is selected from a microporous polyolefin, a ceramic coated polyethylene terephthalate (PET), and a PVDF separator; the separator is coated with an adhesive layer selected from poly(vinylidene fluoride-co-hexafluoropropylene) (PVDF-HFP) copolymer, chlorinated polypropylene, and maleic anhydride/polypropylene.

11. The electrochemical device of claim 1, wherein the separator is a polymer selected from polyimides and polyamides, wherein the polymer is interdispersed with at least one adhesive.

12. The electrochemical device of claim 1, wherein the separator is a polymer selected from crosslinked PVDF and crosslinked poly(ethylene oxide) (PEO).

13. The electrochemical device of claim 1, wherein the separator is from about 10 microns to about 50 microns in thickness.

14. The electrochemical device of claim 1, wherein the size of the pores in the separator range from about 30 nm to 10 microns.

15. A structural panel comprising the electrochemical device of claim 1.

16. The structural panel of claim 15, wherein the panel comprises a polymer, and the outer current collectors of the electrochemical device are adhesively bonded to the polymer.

17. The structural panel of claim 16, wherein a majority of the outer surface of the electrochemical device is encased in the polymer.

18. The structural panel of claim 15, wherein the panel comprises a composite of resin and reinforcement.

19. The structural panel of claim 15, wherein the electrochemical device and panel are conformed to a surface contour.

20. A method for making an electrochemical device, comprising the steps of:

providing one or more electrolytes, one or more separators; four or more electrodes; one or more inner current collectors; and two outer current collectors; wherein at least one electrode is an anode and at least one electrode is a cathode;

the device is assembled by forming a stack comprising the two outer current collectors, four or more electrodes, one or more separators, and one or more inner current collectors; wherein the one or more inner current collectors are inside the two outer current collectors; wherein at least one of the one or more inner current collectors is not bonded to the two outer current collectors;

the one or more electrolytes are added to the one or more separators; and the stack is laminated by heating to about 90° C. or higher under at least 15 psi of pressure; wherein the two outer current collectors are bonded together to create a sealed container for at least one anode, at least one cathode, and one or more separators.

* * * * *